No. 664,478. Patented Dec. 25, 1900.
F. B. HOPEWELL.
MOTOR VEHICLE.
(Application filed Nov. 3, 1899.)
(No Model.)
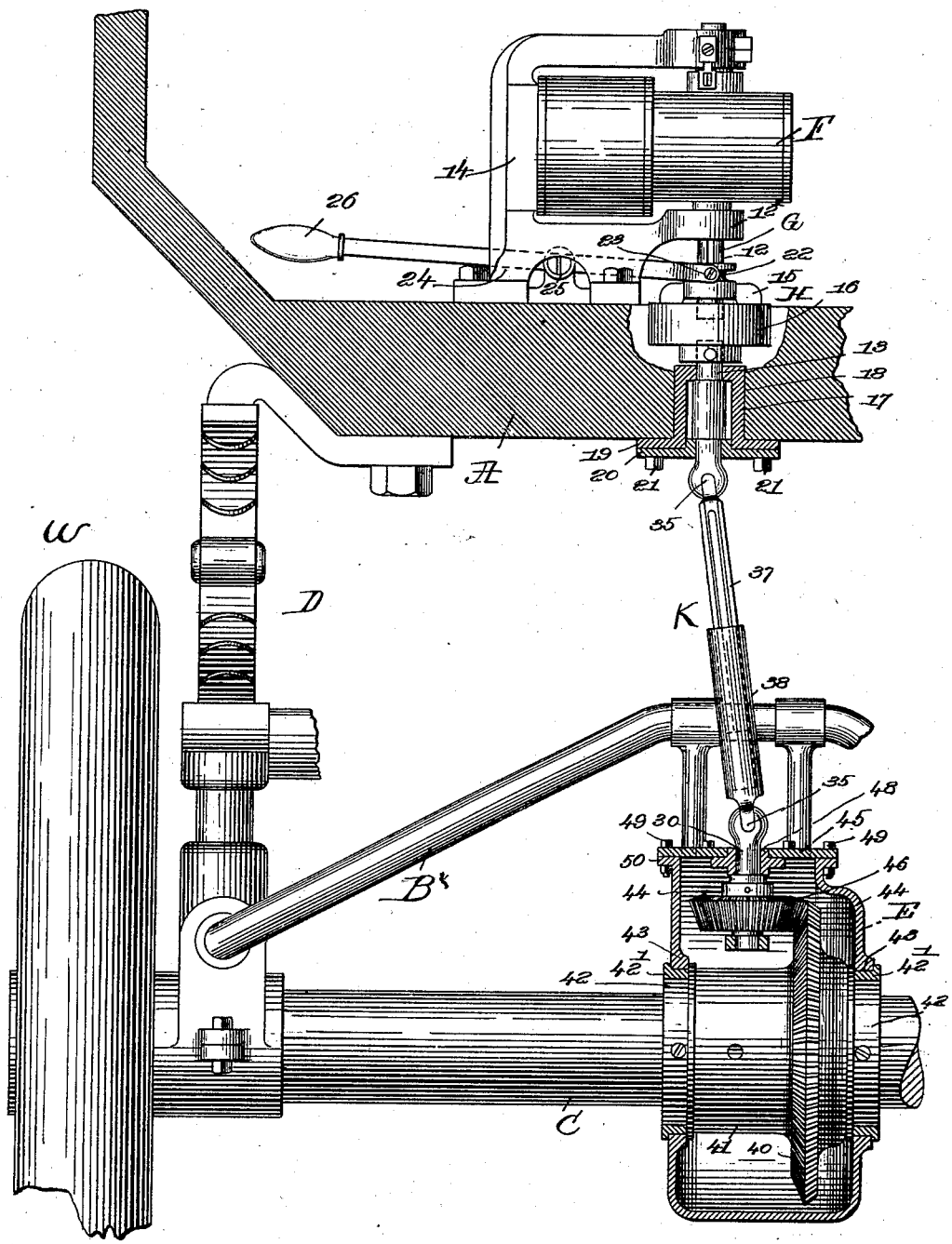
Witnesses:
George L. Dolbeare
Fred S. Grunhof
Inventor:
Frank B. Hopewell
by Crosby Gregory
attys.

UNITED STATES PATENT OFFICE.

FRANK B. HOPEWELL, OF CAMBRIDGE, MASSACHUSETTS.

MOTOR-VEHICLE.

SPECIFICATION forming part of Letters Patent No. 664,478, dated December 25, 1900.

Application filed November 3, 1899. Serial No. 735,703. (No model.)

*To all whom it may concern:*

Be it known that I, FRANK B. HOPEWELL, a citizen of the United States, residing at Cambridge, county of Middlesex, State of Massachusetts, have invented an Improvement in Vehicles, of which the following description, in connection with the accompanying drawing, is a specification, like characters on the drawing representing like parts.

This invention relates to vehicles, and more especially to driving mechanism therefor, and while the latter is capable of use in connection with many different types of vehicles it is of prime importance in connection with those which are subjected during their travel to jolts, jars, &c., which ordinarily tend to seriously affect the proper action of the power driving mechanism. By my improved organization, however, (shown in combination with an automobile or motocycle,) it is possible to run such vehicle over rough and uneven roads without possibility of derangement of the different power-transmitting appliances.

In the embodiment of the vehicle illustrated in the accompanying drawing in a simple and convenient embodiment thereof it involves in its construction a driving-shaft, a laterally-movable two-part shaft adapted to be operatively connected with said driving-shaft and one part of which is movable in the direction of the length of the other, in combination with a shaft or axle having a wheel operatively connected with said two-part shaft. By this construction the axle and the body of the vehicle can have independent or relative movements without throwing the different parts of the driving mechanism out of working relation, as the two-part shaft mentioned can lengthen or shorten or can move laterally in accordance with the movements of the axle or the body.

The invention is shown in sectional rear elevation in the accompanying drawing.

In the drawing, A represents the body of the motocycle, W one of the wheels thereof, and C the axle, the body being mounted upon the running-gear or frame D, said frame having the arch-shaped portions B, which support the bearing-box or housing E, hereinafter more particularly described; and said body, axle, and wheel may be of any suitable kind.

The motor for effecting the operation of the primary shaft of the driving mechanism may be of any suitable character, and I have represented for this purpose an electric motor, and the same is denoted by F, its armature-shaft G being in two sections 12 and 13, respectively, adapted to be operatively connected by an intermediate clutch H. The electric motor F is sustained by the standard or bracket 14, mounted at a convenient place upon the flooring of the body. The upper section 12 of the clutch is keyed to the upper portion 12' of the armature-shaft G and is slidable thereon, so as to move the same into and out of engagement with the relatively-fixed member 16 of said clutch fixed to the lower portion 13 of said armature-shaft. The upper portion of the armature-shaft is directly sustained by the branches of the yoke-shaped bracket or bearing previously referred to, while the lower part thereof is rotatively supported in the bearing-box or bushing 17, snugly fitted in an opening 18 in the floor of the body. The bushing or bearing-sleeve 17 has an annular flange 19 fitted against the under side of the body, and it is held in place by the ring-shaped plate 20, fastening-bolts, as 21, passing through the two parts and being seated in the under side of said body.

The clutch H is of the pin type, and its slidable member 15 has a circumferential groove or channel 22 to receive inwardly-disposed pins, as 23, secured to the branches of the bifurcated lever 24, said lever being fulcrumed, as at 25, to the bracket or bearing 14 and having a handle 26 within easy reach of the operator.

The motor F is connected with some suitable kind of electric generator, (not shown,) and when the two sections of the armature-shaft are coupled through the agency of the clutch the lower portion 13 of the armature-shaft when the motor is set in operation will be rotated.

The handle 26 is within convenient reach of the operator of the vehicle, whereby the same can be readily stopped and started, and by the employment of the clutch the functions specified can be secured without stopping the driving-motor.

The stub-shaft 30 is rotatively supported by the journal-box or housing E previously referred to, and it is shown connected operatively to the driving main shaft G by the shaft K and also to the wheel B. The shaft or connecting-rod K consists of two sections connected by universal joints at its opposite ends, as at 35, with the main or power shaft and the stub-shaft. Said shaft K is represented as consisting of two sections, one of which is movable in the direction of the length of the other, whereby said shaft may be lengthened or shortened to permit relative movements of the body or axle and other parts without throwing the working parts into inactive positions. The shaft K is represented as consisting of two parts, as 37 and 38, respectively, the part 37 being telescopic within its tubular companion 38.

The bevel-gear 40 is secured to the axle C and is inclosed by the boxing E, its hub 41 being suitably secured to said axle for rotation therewith and also with the wheel W. The axle C has fixedly attached thereto at each side of the gear-hub 41 collars 42, which collars are journaled in bushings or bearings 42', said bushings being of any suitable material and being fastened firmly in bearing-openings 43 in the sides of the housing or boxing E. The hub 41 has at each end a flange, as shown in the drawing, which bears against the bushing 42'. The housing protects from dust, dirt, &c., the parts inclosed thereby, and its detachable cap 45 constitutes a bearing for the stub-shaft 30. Said shaft 30 carries a bevel-gear 46, meshing with the bevel-gear 40.

When the two sections of the clutch H are in engagement, the wheel W will be driven through the intermediate parts, and as the vehicle travels forward or backward over a road the extensible shaft K can lengthen and shorten and move laterally whenever obstructions are encountered, by reason of which the action of the main shaft G or the intermeshing gears 40 and 46 cannot possibly be affected.

The stub-shaft 30 extends through the bushing 48 in the cap-plate 45, secured in place by the bolts or like devices 49 passing through the same and through the flange 50 upon the upper side of the boxing E. By removing these bolts 49 access may be had to the interior of the casing for cleaning any of the parts.

The invention is not limited to the precise mechanism hereinbefore set forth, for this may be variously modified within the scope of the accompanying claims.

Having described my invention, what I claim as new, and desire to secure by Letters Patent, is—

1. In a vehicle of the class described, a motor, a primary shaft driven by said motor, an axle having a gear-wheel fast thereon, a casing surrounding said gear-wheel said casing being held against longitudinal movement by said gear-wheel, a stub-shaft supported in said casing and having a gear meshing with the gear on the axle, and a telescopic shaft jointed respectively to the stub-shaft and primary shaft.

2. In a vehicle of the class described, a motor, a primary shaft driven by said motor, an axle having a gear-wheel fast thereon, a casing surrounding said gear-wheel said casing being held against longitudinal movement by said gear-wheel and having a removable cap, a stub-shaft supported by said removable cap said stub-shaft having a gear meshing with the gear on the axle, and a telescopic shaft jointed respectively to the primary shaft and the stub-shaft.

3. In a vehicle of the class described, a body, a motor carried thereby, a primary shaft supported in the floor of the body and driven by said motor, a clutch connecting the primary shaft and motor, an axle, a gear fast thereon, a housing surrounding said gear and carrying a stub-shaft, a gear on the stub-shaft connecting with the gear on the axle, and a two-part telescopic shaft connecting the stub-shaft and primary shaft.

4. In a vehicle of the class described, an axle provided with a gear, a fixed casing surrounding said gear, and having a removable cap, a stub-shaft journaled in the removable cap, said stub-shaft having a gear meshing with the gear on the axle, a motor on the body of the vehicle, and a two-part telescopic shaft having a universal joint, connecting the motor with the stub-shaft.

5. In a vehicle of the class described, a shaft or axle having a wheel, a gear secured to said shaft or axle, collars carried by the shaft at opposite sides of the gear, a fixed casing or boxing adapted to rotatively receive the collars and having a removable cap, a stub-shaft supported by said removable cap and having a gear meshing with the first-mentioned gear, a primary shaft, and a telescopic shaft jointed respectively to the primary shaft and the stub-shaft.

6. In a vehicle of the class described, a body, an axle having a wheel, a primary shaft upon the body, and driving connections between the primary shaft and the body, said driving connections including a shaft shiftably mounted relatively to the body and the axle.

In testimony whereof I have signed my name to this specification in the presence of two subscribing witnesses.

FRANK B. HOPEWELL.

Witnesses:
HEATH SUTHERLAND,
LOUISE ROTHSTEIN.